(12) United States Patent
Rasiah

(10) Patent No.: US 8,955,861 B1
(45) Date of Patent: Feb. 17, 2015

(54) FULCRUM LEVER PEDAL BAR BICYCLE

(76) Inventor: Randolph Raviraj Rasiah, Canoga Park, CA (US)

( * ) Notice: Subject to any disclaimer, the term of this patent is extended or adjusted under 35 U.S.C. 154(b) by 83 days.

(21) Appl. No.: 13/507,681

(22) Filed: Jul. 19, 2012

(51) Int. Cl.
  *B62M 1/00* (2010.01)
  *B62M 1/26* (2013.01)

(52) U.S. Cl.
  CPC ....................................... *B62M 1/26* (2013.01)
  USPC ............................................ 280/256; 280/253

(58) Field of Classification Search
  USPC ................................................. 280/256, 253
  See application file for complete search history.

(56) References Cited

U.S. PATENT DOCUMENTS

| | | | | | |
|---|---|---|---|---|---|
| 3,132,877 | A | * | 5/1964 | Pontin | 280/257 |
| 3,906,807 | A | * | 9/1975 | Trammell, Jr. | 74/143 |
| 4,053,173 | A | * | 10/1977 | Chase, Sr. | 280/253 |
| 4,456,276 | A | * | 6/1984 | Bortolin | 280/257 |
| 4,564,206 | A | * | 1/1986 | Lenhardt | 280/252 |
| 4,577,879 | A | * | 3/1986 | Vereyken | 280/256 |
| 4,666,173 | A | * | 5/1987 | Graham | 280/255 |
| 5,405,157 | A | * | 4/1995 | Bezerra et al. | 280/253 |
| 5,501,476 | A | * | 3/1996 | Howell et al. | 280/230 |
| 7,669,869 | B2 | * | 3/2010 | Meguerditchian | 280/256 |
| 7,717,446 | B2 | * | 5/2010 | Pate et al. | 280/221 |
| 2009/0224506 | A1 | * | 9/2009 | Sakirov | 280/252 |

* cited by examiner

*Primary Examiner* — Joseph Rocca
*Assistant Examiner* — Michael Stabley

(57) ABSTRACT

A bicycle with a driving train has a continuous chain connecting the spindle connected front sprocket to the rear one way engaging other way ratcheting sprocket situated at the rear wheel hub. Two long fulcrum lever pedal bars are pivoted about two-thirds away from its front end to a bicycle frame. A connecting rod is connected pivotally to the rear end of each fulcrum lever pedal bars. The other end of each connecting rods are connected pivotally to their sides spindle arms, which are connected opposite to each other to the spindle. A pedal is fitted at the front end of both fulcrum lever pedal bars. Whereby, when the pedal is at its top position the rider's foot presses the pedal, thus the drive train is in motion. The other pedal is making its way to the top position. Pressing the pedal alternatively keeps the bicycle in continuous motion.

1 Claim, 4 Drawing Sheets

FIG·1

FIG·4
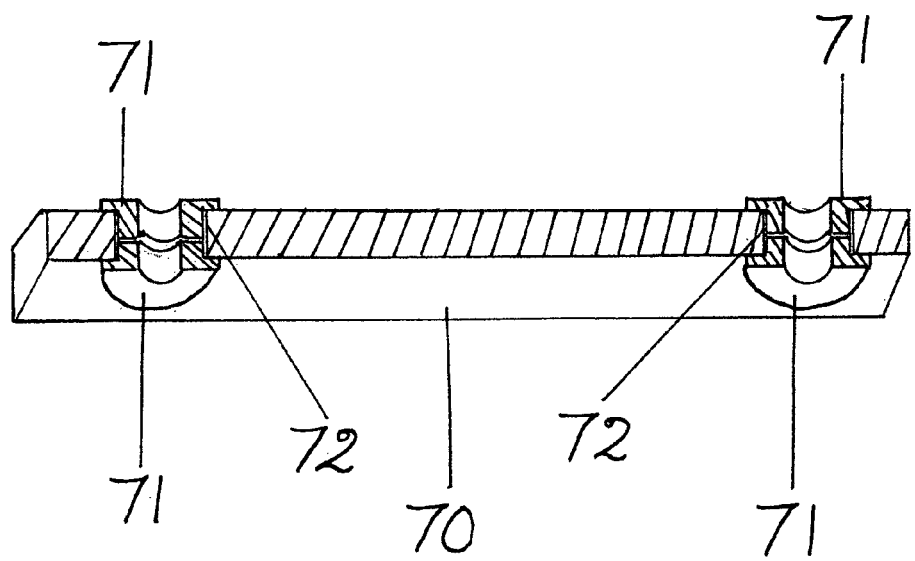

FULCRUM LEVER PEDAL BAR BICYCLE

FEDERALLY SPONSORED RESEARCH

Not Applicable

SEQUENCE LISTING OR PROGRAM

Not Applicable

BACKGROUND OF THE INVENTION

1. Field of Invention

This invention relates to bicycles, specifically to an improved pedaling mechanism for bicycles.

2. Prior Art

Originally, when John Kemp Starley in 1885 (England) invented the conventional bicycle, the pedal was fitted to the crank arm. The limitation of the length of the crank arm was subjected to what distance a person's foot could push a pedal from TDC to BDC. This made the size of the crank arm to be not longer than eight inches, which is sixteen inches from TDC to BDC. What he invented must have satisfied his expectation.

The bicycle rider has to pedal hard either with a six, seven or a eight inches pedal. It was not thought and explored well enough in providing a better pedaling system and concept at that time.

There have been many inventors that have made their designs and concepts, trying to meet this need to achieve more output force from using less input force when pedaling. Glenn H. Coment, U.S. Pat. No. 5,899,119, May 4, 1999, invented a bicycle crank assembly with an angle pedal arm. Not much was benefited as the limitation of the pedal arm's length. Franciscus A. Vereyken, U.S. Pat. No. 4,026,571, May 31, 1977, had done work trying to improve the invention of France Patent Number: 432,826, Oct. 19, 1911, and Netherlands's Patent Number 43,737, March 1938.

These three inventions have a pedaling arm that is connected to the rear end of the bicycle with a new design of the frame. These designs eliminated the main sprocket and due to that, derailleur gears cannot be used. Franciscus A. Vereyken, U.S. Pat. No. 4,577,879, 1986, invented another design of a pedaling system with a sliding arm arrangement to go from pedal arm to the rear wheel axle fastening. None of them were able to provide much of a satisfying improvement for use.

OBJECTS AND ADVANTAGES

Accordingly, there are several objects and advantages of the fulcrum lever pedal bar for bicycles described in my above patent. Several objects and advantages of the present inventions are:

(a) To provide more torque with less effort required by the rider, as my design of the fulcrum lever pedal bar is longer in comparison with eight-inch pedal crank arm, used by a conventional bicycle.

(b) To provide easy pedaling to the rider in pushing the pedals down by each foot at a time. This eliminates extra effort of feet continuously rotating the pedals that of a conventional bicycle.

(c) To provide a pedaling system without any dead power spot compared to a conventional bicycle which has dead power spots at ninety degrees when one pedal arm at TDC the other one is at BDC.

(d) To provide hill climbing to be easier, with a pedaling system with no dead power spots, to benefit the bicycle rider with easier pedaling.

(e) To provide a pedaling system that could readily use a derailleur gear system to gain extra benefit if it's needed.

(f) To provide a pedaling system of simplicity that makes it desirable to a manufacturer.

(g) Further, objects and advantages are to provide a bicycle pedaling system with very few parts that are easy to make, service, and repair. Mass production will further bring production costs down and much more affordable to buy and use. Still, further objects and advantages will become apparent from a consideration of the ensuing description and drawings.

SUMMARY

In accordance with the present invention, a pedaling system with a concept of fulcrum lever pedal bars, which are pivoted at about two-thirds away from its front end, where the pedals are fitted. Each rear end of the said fulcrum lever pedal bars are fitted with pivot pin, which is joint to it solidly and then is connected pivotally to the top end of a connecting rod. Both the connecting rods on the other end are fitted pivotally to a distal end of two spindle arms at its pivot pin, one on each side to a spindle arm, the pivot pin is joint solidly to the spindle arm. The drive train side of the spindle arm is attached at its center to a sprocket wheel and through their center hole connected securely to the spindle, which is housed rotatably in the bicycle frame. The said sprocket wheel has a continuos chain that goes over it; and the other end of the chain is connecting to a one way engaging and other way ratcheting or free wheeling sprocket wheel, which is connected to the rear wheel hub and axle of the bicycle. The chain is adjusted to be in tension to avoid slipping.

DRAWINGS

Figures

In the drawings of FIG. 1 and FIG. 2, they have the same numerals except FIG. 1 has an additional numeral 28, and all other figures have different numbers.

Figure 3:
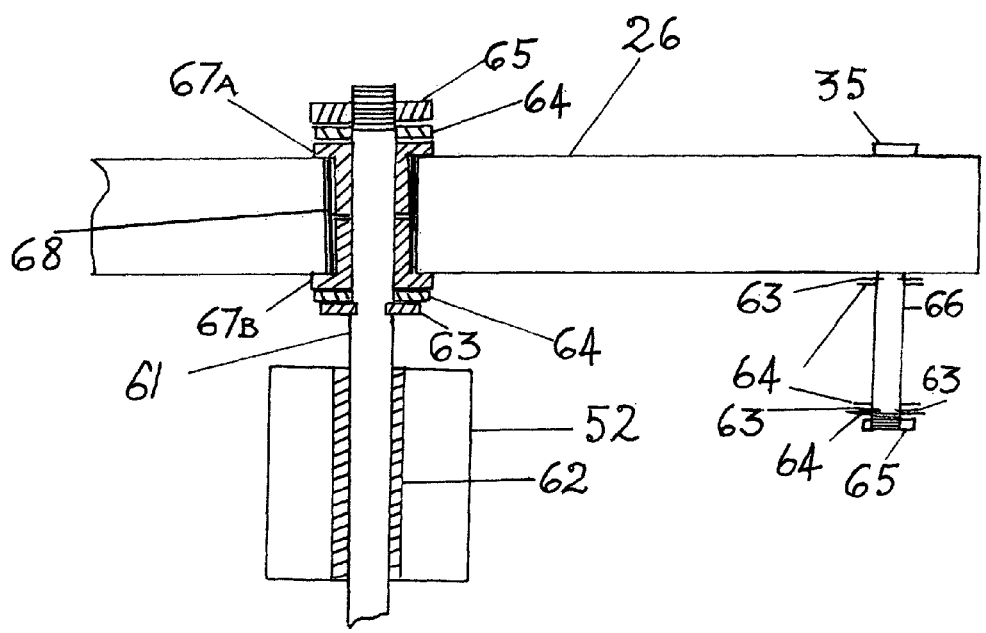

FIG. 3 shows the fulcrum pivot shaft and its assembly that fits into its housing on the bicycle frame, and the fulcrum lever pedal bar and its assembly fitted to the fulcrum pivot shaft. The drawing shows one side of the fulcrum lever pedal bar. The other side bearings and the hardware are also assembled and fitted in the same manner to the fulcrum lever pedal bar and to the fulcrum pivot shaft.

FIG. 4 shows the connecting rod and how the split flange bronze bearing bushed into the steel tubing which is inserted and welded at the edge of the connecting rods.

DRAWINGS

Reference Numerals

Figure 1:
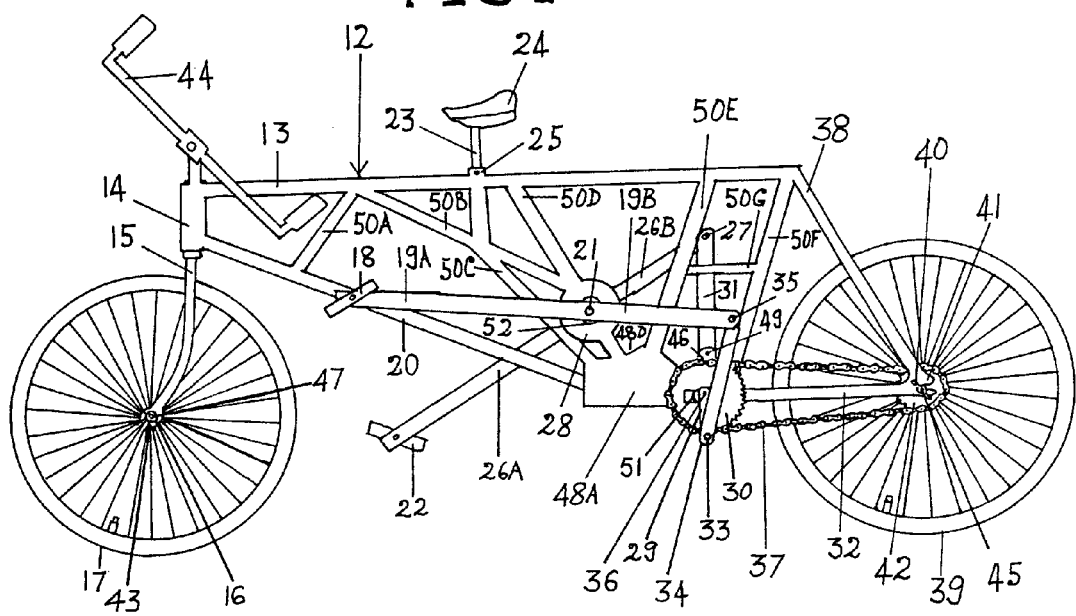
FIG. 1 shows the bicycle with a new frame, to facilitate the housing for the fulcrum pivoting shaft of the novel design of the fulcrum lever pedal bar mechanism, and the location of various parts assembled and fitted on it. This figure is the drawing of the preferred embodiment using straight fulcrum-lever pedal bars.
Figure 2:
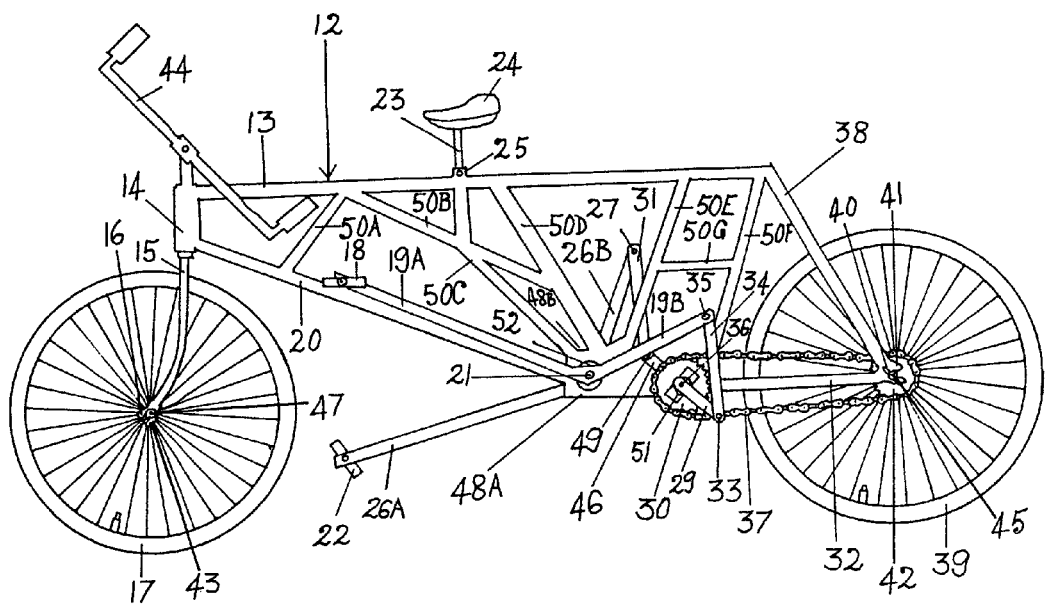
FIG. 2 shows a bicycle frame and the location of the various parts fitted on it. This figure is the drawing of the alternative embodiment using angle fulcrum-lever pedal bars.

FIG. 1 and FIG. 2
12 frame
13 top tube
14 head tube
15 fork
16 nut
17 front wheel
18 pedal, left
19a fulcrum lever pedal bar, left front
19b fulcrum lever pedal bar, left rear
20 down tube
21 fulcrum pivot shaft and assembly
22 pedal, right
23 seat post
24 seat
25 seat tube
26a fulcrum lever pedal bar, right front
26b fulcrum lever pedal bar, right rear
27 pivot pin assembly
29 spindle arm, left
30 front sprocket wheel
31 connecting rod, right
32 chain stay
33 pivot pin assembly
34 connecting rod, left
35 pivot pin assembly
36 spindle and assembly
37 chain
38 rear stay
39 rear wheel
40 nut
41 rear fork dropout
42 rear sprocket wheel
43 front fork dropout
44 handle bar
45 rear axle
46 spindle arm, right
47 front axle
48a gusset, left
48b gusset, right
49 pivot pin assembly
50a frame tube
50b frame tube
50c frame tube
50d frame tube
50e frame tube
50f frame tube
50g frame tube
51 bottom bracket shell
52 fulcrum pivot shaft housing
28 gusset (applies only to FIG. 1)
FIG. 3
61 fulcrum pivot shaft
52 fulcrum pivot housing
62 inner steel tubing
63 retainer lock ring
64 washer
26 fulcrum lever pedal bar
65 nut
66 pivot pin (27 and 35 of FIGS. 1 and 2)
67A split flange bronze bearing, outer
67B split flange bronze bearing, inner
68 steel tubing FIG. 4
70 connecting rod (31 and 34 of FIGS. 1 and 2)
71 split flange bronze bearing
72 steel tubing

DETAILED DESCRIPTION

FIG. 1

Preferred Embodiment

A preferred embodiment of the present invention of the bicycle fulcrum lever pedal bar is illustrated in FIG. 1 (left side view). This shows the embodiment of the parts on a bicycle frame 12, which is longer compared to a conventional bicycle frame; and it has a pivot shaft housing and shaft for pivoting purpose. This embodiment shows a straight fulcrum lever pedal bar.

The bicycle frame is fabricated with steel tubes, a top tube 13, and a down tube 20, and a head tube 14, and chain stay 32, and rear stay 38, and in between connecting tubes 50a, 50b, 50c, 50d, 50e, 50f, 50g, and gussets right side 48a and left side 48b and fulcrum pivot shaft housing gusset 28. All the tubing will be joined together by couplers and by welding. The bicycle frame has two housings made in it, the bottom bracket shell 51 and fulcrum pivot shaft housing 52.

A front wheel 17 with the front axle 47 mounted on the fork 15 on its front fork dropout 43 and fastened to both the sides of the front axle 47 with nuts 16, the fork 15 is fitted movably to the head tube 14 of the frame 12, and a rear wheel 39 mounted on the rear fork dropout 41 of the frame 12 and fastened to both the sides of rear axle 45 with nuts 40, the rear axle 45 has a rear sprocket wheel 42, and over it a continuos chain 37 connecting it to the front sprocket wheel 30, and at its center is connected together with the left spindle arm 29 and at the hole at their center they are entered into the spindle of the spindle and assembly 36 and fastened, the spindle is rotatably assembled in the bottom bracket shell 51 of the frame, and other side of the spindle is connected with a right spindle arm 46, and both the spindle arms are connected on their other end to a connecting rod, left spindle arm 29 to connecting rod 34 at its pivot pin assembly 33 and right spindle arm 46 to connecting rod 31 at its pivot pin assembly 49, which are on the other end connected pivotally to the pivoting pin which is solidly fitted to the rear end of both the fulcrum lever pedal bars. The fulcrum lever pedal bar 19b by pivot pin assembly 35 and fulcrum lever pedal bar 26b by pivot pin assembly 27 to their respective sides and at the front end of the fulcrum lever pedal bars 19a and 26b, each are fitted with a pedal, pedal 18 and 22.

The fulcrum lever pedal bars are fitted pivotally to the frame at the fulcrum pivot shaft assembly 21 in the fulcrum pivot housing 52 to the fulcrum pivot shaft 61 of FIG. 3, the frame 12 is fitted with a seat 24 which is fitted on the seat post 23 and positioned in seat tube 25, and a handle bar 44 is attached to fork 15 through head tube 14 to steer the front wheel 17.

Pivoting pin 27 and 35 are shown as 66 in FIG. 3 and showing how they are solidly fitted to The rear of the fulcrum lever pedal bars.

The preferred embodiments parts, materials, shapes, dimensions, and sizes "I presently prefer" are:

The fulcrum lever pedal bars are made of 3½ inches by 1½ inches rectangular 14 gauge steel tubing. The front side of the fulcrum lever pedal bar extends 18 inches from the pivoting point, and the rear side of the fulcrum lever pedal bar extends about 10 inches from the pivoting point. An additional inch is to be added for pivoting point area space. Overall length of the fulcrum lever pedal bars are 29 inches. Holes must be drilled to the 3½ inch side of the fulcrum lever pedal bars at the fulcrum point, and round steel tubing 68 of FIG. 3 has to be inserted at the drilled holes. Then the tubing and fulcrum level pedal bars must be welded on both sides of the edges to join both together. The tubing is used for a pair of split flange bronze bearings 67a and 67b of FIG. 3, that are to be bushed in from the ends of the tubing, and to be inserted into the fulcrum pivot shaft, which is attached to the bicycle frame by fulcrum pivot shaft housing 52.

The connecting rod 31 and 34 and shown as 70 of FIG. 4 are made of 3½ inches by 1½ inches, rectangular 14 gauge steel tubing, with the length of about 10 inches. Holes must be drilled to the 3½ inch side of the connecting rods of about ¾ inch away from the edges of the rectangular tubing at both their ends and round steel tubing 72 as shown in FIG. 4 has to be inserted and welded at their edges. This is done to accommodate the insertion of the split flange bronze bearing 71 as shown in FIG. 4 for pivoting purposes.

The connecting rod side of the spindle arm at its end a pivoting pin is fitted solidly to it for pivoting it to the connecting rod; a pair split flange bronze bearing is to be bushed in from both sides of the hole to pivot it to the connecting rod.

Spindle arm 36 is to extend about 1½ inches beyond the outer diameter of the 6 inches sprocket wheel 30.

The fulcrum pivot shaft housing 52 is about 5½ inches vertically up from the bottom bracket shell 51 of the frame, and 7½ inches away horizontally from the spindle and assembly 36. The fulcrum pivot shaft of fulcrum pivot shaft assembly 21 has an inner steel tubing 62 as shown in FIG. 3 and it has to be welded together with the fulcrum pivot shaft 61 of FIG. 3 also this shaft has a groove in it and a retainer lock ring 63 as shown in FIG. 3 to be snapped in to keep the fulcrum lever pedal bars 19 and 26 in position. Two washers 64 of FIG. 3 are used at both sides of the split flange bronze bearing 71 of FIG. 4 and a nut 65 to be fastened at the end of the fulcrum pivot shaft of the fulcrum pivot shaft and assembly 21.

Adjusting the distance between the fulcrum point and the spindle will enable to arrive at the various pedal traveling distance. When manufacturing, this has to be taken into consideration to cater the needs of the right pedal traveling distance for people of all heights: tall, average, or short. This up and down pedaling distance will be shorter by increasing the distance between the fulcrum point and the spindle. By decreasing the distance between both will give a longer up and down pedaling distance.

Operation—FIG. 1

The drive train front sprocket wheel 30, chain 37, rear Sprocket wheel 42, the rear hub and their functions remain the same as of a conventional bicycle. The spindle arms 29 and 46 is connected rotatably to connecting rods 34 and 31 each to their sides; and the other end of the connecting rods are connected to the fulcrum lever pedal bars 19b and 26b on their respective sides. The fulcrum lever pedal bars are pivoted movably to the bicycle frame 12 and the front end of the fulcrum lever pedal bar 19a and 26a is fitted with pedals 18 and 22.

When the pedal 18, along with front side of the fulcrum lever pedal bar is at its top position, the left spindle arm 29 is at BDC position, and the connecting rod 34 is connected to the fulcrum lever pedal bar at about an one o'clock position, or at an angle of about 30 degrees towards the rear. When the pedal is depressed the rear part of the fulcrum lever pedal bar is also getting lifted upwards and drawing the spindle arm towards the TDC position. This action has caused the sprocket wheel to turn and make the rest of the drive train to be in motion in turning the rear wheel, which is in friction to the ground and causes the bicycle to move in a forward motion. This action is continued by depressing the left pedal and right pedal alternatively.

The fulcrum lever pedal bars moves on a up and down vertical path while pedaling and it does not rotate like a conventional bicycle pedaling, which works on a circular path.

DESCRIPTION

Alternative Embodiment

FIG. 2

This alternative embodiment shows an angle fulcrum lever pedal bar. Its efficiency is less compared to the preferred embodiment. This figure shows the embodiment of parts on bicycle frame 12, which is longer compared to a conventional bicycle frame. The drawing shows fulcrum lever pedal bar with an angle of about 130 degrees. The fulcrum lever pedal bars could be made with angles between 90 degrees to 179 degrees.

The bicycle frame is fabricated with steel tubes and they are a top tube 13, and a down tube 20, and a head tube 14, and chain stay 32, and rear stay 38, and in between connecting tubes 50a, 50b, 50c, 50d, 50e, 50f, 50g, and gussets right side 48a and left side 48b. All the tubing will be joined together by couplers and by welding. The bicycle frame has two housings made in it, the bottom bracket shell 51 and fulcrum pivot housing 52.

A front wheel 17 with the front axle 47 mounted on the fork 15 on its front fork dropout 43 and fastened to both the sides of the front axle 47 with nuts 16, the fork 15 is fitted movably to the head tube 14 of the frame 12, and a rear wheel 39 mounted on the rear fork dropout 41 of the frame 12 and fastened to both the sides of rear axle 45 with nuts 40, the rear axle 45 has a rear sprocket wheel 42, and over it a continuos chain 37 connecting it to the front sprocket wheel 30, and at its center is connected together with the left spindle arm 29 and at the hole at their center they are entered into the spindle of the spindle and assembly 36 and fastened, the spindle is rotatably assembled in the bottom bracket shell 51 of the frame, and other side of the spindle is connected with a right spindle arm 46, and both the spindle arms are connected on their other end to a connecting rod, left spindle arm 29 to connecting rod 34 at its pivot pin assembly 33 and right spindle arm 46 to connecting rod 31 at its pivot pin assembly 49, which are on the other end connected pivotally to the pivoting pin which is solidly fitted to the rear end of both the fulcrum lever pedal bars. The fulcrum lever pedal bar 19b by pivot pin assembly 35 and fulcrum lever pedal bar 26b by pivot pin assembly 27 to their respective sides and at the front end of the fulcrum lever pedal bars 19a and 26b, each are fitted with a pedal, pedal 18 and 22.

The fulcrum lever pedal bars are fitted pivotally to the frame at the fulcrum pivot shaft assembly 21 in the fulcrum pivot housing 52 to the fulcrum pivot shaft 61 of FIG. 3, the frame 12 is fitted with a seat 24 which is fitted on the seat post 23 and positioned in seat tube 25, and a handle bar 44 is attached to fork 15 through head tube 14 to steer the front wheel 17

Pivoting pin 27 and 35 are shown as 66 in FIG. 3 and showing how they are solidly fitted to The rear of the fulcrum lever pedal bars.

The preferred embodiments parts, materials, shapes, dimensions, and sizes "I presently prefer" are:

The fulcrum lever pedal bars are made of 3½ inches by 1½ inches rectangular 14 gauge steel tubing. The front side of the fulcrum lever pedal bar extends 18 inches from the pivoting point, and the rear side of the fulcrum lever pedal bar extends about 10 inches from the pivoting point. An additional inch is to be added for pivoting point area space. Overall length of the fulcrum lever pedal bars are 29 inches. Holes must be drilled to the 1½ inch side of the fulcrum lever pedal bars at the fulcrum point, and round steel tubing 68 of FIG. 3 has to be inserted at the drilled holes. Then the tubing and fulcrum level pedal bars must be welded on both sides of the edges to join both together. The tubing is used for a pair of split flange bronze bearings 67a and 67b of FIG. 3, that are to be bushed in from the ends of the tubing, and to be inserted into the fulcrum pivot shaft, which is attached to the bicycle frame by fulcrum pivot shaft housing 52.

The connecting rod 31 and 34 and shown as 70 of FIG. 4 are made of 3½ inches by 1½ inches, rectangular 14 gauge steel tubing, with the length of about 10 inches. Holes must be drilled to the 3½ inch side of the connecting rods and about ¾ inches away from the edges of the rectangular tubing at their ends and round steel tubing 72 as shown in FIG. 4 has to be inserted and welded at their edges. This is done to accommodate the insertion of the split flange bronze bearing 71 as shown in FIG. 4 for pivoting purposes.

The connecting rod side of the spindle arm at its end a pivoting pin is fitted solidly to it for pivoting it to the connecting rod; a pair split flange bronze bearing is to be bushed in from both sides of the hole to pivot it to the connecting rod.

Spindle arm 36 is to extend about 1½ inches beyond the outer diameter of the 6 inches sprocket wheel 30.

The fulcrum pivot shaft housing 52 is about 5½ inches vertically up from the bottom bracket shell 51 of the frame, and 7½ inches away horizontally from the spindle and assembly 36. The fulcrum pivot shaft of fulcrum pivot shaft assembly 21 has an inner steel tubing 62 as shown in FIG. 3 and it has to be welded together with the fulcrum pivot shaft 61 of FIG. 3 also this shaft has a groove in it and a retainer lock ring 63 as shown in FIG. 3 to be snapped in to keep the fulcrum lever pedal bars 19 and 26 in position. Two washers 64 of FIG. 3 are used at both sides of the split flange bronze bearing 71 of FIG. 4 and a nut 65 to be fastened at the end of the fulcrum pivot shaft of the fulcrum pivot shaft and assembly 21.

Adjusting the distance between the fulcrum point and the spindle will enable to arrive at the various pedal traveling distance. When manufacturing, this has to be taken into consideration to cater the needs of the right pedal traveling distance for people of all heights: tall, average, or short. This up and down pedaling distance will be shorter by increasing the distance between the fulcrum point and the spindle. By decreasing the distance between both will give a longer up and down pedaling distance.

Operation—FIG. 2

The drive train's front sprocket wheel 30, chain 37, rear sprocket wheel 42, the rear hub and their functions remain the same as of a conventional bicycle. The spindle arms 29 and 46 is connected rotatably to connecting rods 34 and 31 each to their sides; and the other end of the connecting rods are connected to the fulcrum lever pedal bars 19b and 26b on their respective sides. The fulcrum lever pedal bars are pivoted movably to the bicycle frame 12 and the front end of the fulcrum lever pedal bar 19a and 26a is fitted with pedals 18 and 22.

When the pedal 18, along with front side of the fulcrum lever pedal bar is at its top position the left spindle arm 29 is at BDC position, and the connecting rod 34 is connected to the fulcrum lever pedal bar at about an one o'clock position, or at an angle of about 30 degrees to the rear. When the pedal is depressed the rear part of the fulcrum lever pedal bar is also getting lifted upwards and drawing the spindle arm towards the TDC position. This action has caused the sprocket wheel to turn and make the rest of the drive train to be in motion and turning the rear wheel, which is in friction to the ground and causes the bicycle to move in a forward motion. This action is continued by depressing the pedals left and right alternatively.

The fulcrum lever pedal bars moves up and down while pedaling on a vertical path, and it Does not rotate like in a conventional bicycle pedaling, which works on a circular path.

CONCLUSION, RAMIFICATION, AND SCOPE

Accordingly, the reader will see that the pedaling mechanism of this invention provides a better, efficient, and faster bicycle. This allows the rider to be more comfortable while riding, as it gives more output for the effort applied in pedaling as compared to a conventional bicycle; while benefiting the rider to get to his destination much quicker. I believe that this invention will once again put bicycles as a good mode of transportation, because it goes along with the present day desire of faster vehicles.

It permits more torque with less effort required by the rider, as this design of the fulcrum pedal bar is longer in comparison with the eight-inch pedal crank arm, used by a conventional bicycle.

It provides easy pedaling for the rider, pushing the pedals down by each foot at a time. This eliminates extra effort of a rider's feet continuously rotating the pedal as of a conventional bicycle.

It provides a pedaling mechanism without any dead power spots compared to a conventional bicycle, which has dead spots at ninety degrees when a pedal bar is at TDC and the other at BDC.

It provides an easier hill climb, with a pedaling system without any dead power spots, which is beneficial for a rider's need for easier pedaling.

It provides a pedaling system that could readily use a derailleur gear system to gain extra benefit, if needed.

It provides a pedaling system of simplicity that makes it very desirable to manufacture.

It permits easy service and repair by it being a simple design.

Although the description above contains many specificities, these should not be construed as limiting the scope of the invention, but as merely providing illustrations of some of the preferred embodiments of this invention. For example:

The places where split bronze bearings are used ball bearing could also be used in their place. The rider's seat could be brought more towards the rear of the bicycle; and the handle bar can be extended towards the rear. The front part of the fulcrum lever pedal bar could be made adjustable by having an outer sliding tube. The outer sliding tube has the pedal on its front end, and this tube is telescopic over the fulcrum lever pedal bar so a rider could adjust to shorten it or extend it.

Thus, the scope of the invention should be determined by the appended claims and their legal equivalents, rather than by the examples given.

I claim:

1. A bicycle pedaling mechanism comprising: a fulcrum lever pedaling mechanism to torque a drive train of a bicycle, said pedaling mechanism comprising two long fulcrum lever pedal bars pivotally fulcrumed on a fulcrum pivoting shaft at about the center on a bicycle frame; wherein a rear of said fulcrum lever pedal bars are each movably fitted with a respective connecting rod; said connecting rods are each connected to a respective spindle arm, said spindle arms are each attached to a front sprocket wheel; said connecting rods coupled to both a spindle and said drive train of a bicycle via said respective spindle arms and said front sprocket wheel, a chain connected to both said front sprocket wheel and a rear sprocket wheel, said rear sprocket wheel is configured such that it engages when rotated in one direction and freewheels when rotated in an opposite direction, and a rear hub;

wherein the fulcrum pivoting shaft is located rearwards of the seat and above the front sprocket;

wherein front ends of each of said fulcrum lever pedal bars are each fitted with a pedal and said spindle arms are mounted to said spindle in opposing direction to each other;

wherein when the right side said spindle arm is at top dead center (TDC), the left side said spindle arm is at bottom dead center (BDC), and when the left side said pedal along with its front side of said fulcrum lever pedal bar is at its top position the left side said spindle arm is at BDC position and its said connecting rod is at about the one o'clock position or at an angle of about 30 degrees to the rear;

wherein when said pedal is depressed and the rear of said fulcrum lever pedal bar is also getting lifted upwards and drawing said spindle arm towards the TDC position, said front sprocket wheel turns and makes the rest of said drive train turn a rear wheel which is at an end of said drive train, said rear wheel configured to be in frictional contact with the ground so as to cause said bicycle to achieve forward motion; and wherein continued forward motion is achieved by continuing to depress said left and right pedals alternatively.

* * * * *